United States Patent
Ghabra et al.

(10) Patent No.: US 8,427,289 B2
(45) Date of Patent: Apr. 23, 2013

(54) LOW LATENCY INSIDE/OUTSIDE DETERMINATION FOR PORTABLE TRANSMITTER

(75) Inventors: Riad Ghabra, Dearborn Heights, MI (US); Nikolay Yakovenko, West Bloomfield, MI (US); Hilton W. Girard, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 356 days.

(21) Appl. No.: 12/816,675

(22) Filed: Jun. 16, 2010

(65) Prior Publication Data

US 2011/0309922 A1 Dec. 22, 2011

(51) Int. Cl.
*B60R 25/10* (2006.01)
(52) U.S. Cl.
USPC ..... 340/426.36; 340/5.7; 340/5.72; 340/5.61; 340/539.21
(58) Field of Classification Search ............. 340/426.36, 340/5.7, 5.72, 5.61, 426.16, 539.21; 343/711; 307/10.1, 10.2, 10.5
See application file for complete search history.

(56) References Cited

U.S. PATENT DOCUMENTS

| | | | |
|---|---|---|---|
| 6,570,486 B1 | 5/2003 | Simon et al. | |
| 6,906,612 B2 * | 6/2005 | Ghabra et al. | 340/5.61 |
| 7,292,137 B2 * | 11/2007 | Gilbert et al. | 340/426.3 |
| 7,425,886 B2 * | 9/2008 | Yoshii et al. | 340/5.72 |
| 7,683,764 B2 * | 3/2010 | Kurpinski et al. | 340/426.36 |
| 7,850,078 B2 * | 12/2010 | Christenson et al. | 235/382 |
| 2003/0193388 A1 | 10/2003 | Ghabra et al. | |
| 2005/0258936 A1 | 11/2005 | Ghabra et al. | |
| 2007/0040649 A1 | 2/2007 | Dulgerian et al. | |
| 2008/0231417 A1 | 9/2008 | Kurpinski et al. | |
| 2009/0256677 A1 | 10/2009 | Hein et al. | |

FOREIGN PATENT DOCUMENTS

| | | |
|---|---|---|
| DE | 10045762 A1 | 4/2002 |
| JP | 7203517 A1 | 8/1995 |
| JP | 2004278050 A | 10/2004 |
| WO | 2006015418 A1 | 2/2006 |

OTHER PUBLICATIONS

Great Britain Search and Examination Report for Application No. GB1110124.3, mailed Oct. 18, 2011.
German Office Action for corresponding German Application No. 10 2011 075 853.4, mailed Oct. 11, 2012, 8 pages.

* cited by examiner

*Primary Examiner* — Toan N Pham
(74) *Attorney, Agent, or Firm* — Brooks Kushman P.C.

(57) ABSTRACT

A method and system is disclosed for determining presence of a portable transmitter relative to a boundary. The presence may be determined according to whether the portable transmitter is interior or exterior to the boundary. The boundary may be defined as a wireless boundary that corresponds with an intersection or overlapping portion set by multiple antenna fields.

20 Claims, 3 Drawing Sheets

LOW LATENCY INSIDE/OUTSIDE DETERMINATION FOR PORTABLE TRANSMITTER

TECHNICAL FIELD

The present invention relates to methods and system of determining whether a portable transmitter is located inside or outside a specified boundary, such as but not limited to whether a fob is located inside or outside of a vehicle.

BACKGROUND

In an automotive passive entry system that includes one or more remote transceiver fobs, it may be desirable to maintain a high level of security while maintaining the lowest latency of actuation. To achieve these requirements, in part, it may be necessary to know if an authorizing fob is inside or outside of a vehicle before actuating passive functions.

A series of one or more short range antennas may be provided inside and outside of the vehicle for use in determining fob locations. The antennas may be activated sequentially to transmit a series of encoded signals to any nearby fobs, which the fobs then respond to via an onboard transmitter to the controlling system located within the vehicle. The responses from the fobs carry signal level information that was acquired during the activation of the antennas. The signal levels reported may then be used, in part, by the passive entry controlling system to determine the exact location of all the fobs.

To maintain the correct level of security when performing certain passive entry related functions such as lock, unlock, etc., it may be necessary to know, at that exact moment, the exact position of the present fobs to determine if the function can be allowed to execute. It can be a time consuming communication process to sequentially activate the necessary amount of antennas required to fully locate all present fob's positions. Because of this penalty, activation latency can contribute to an unfavorable user experience.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Figure 1:
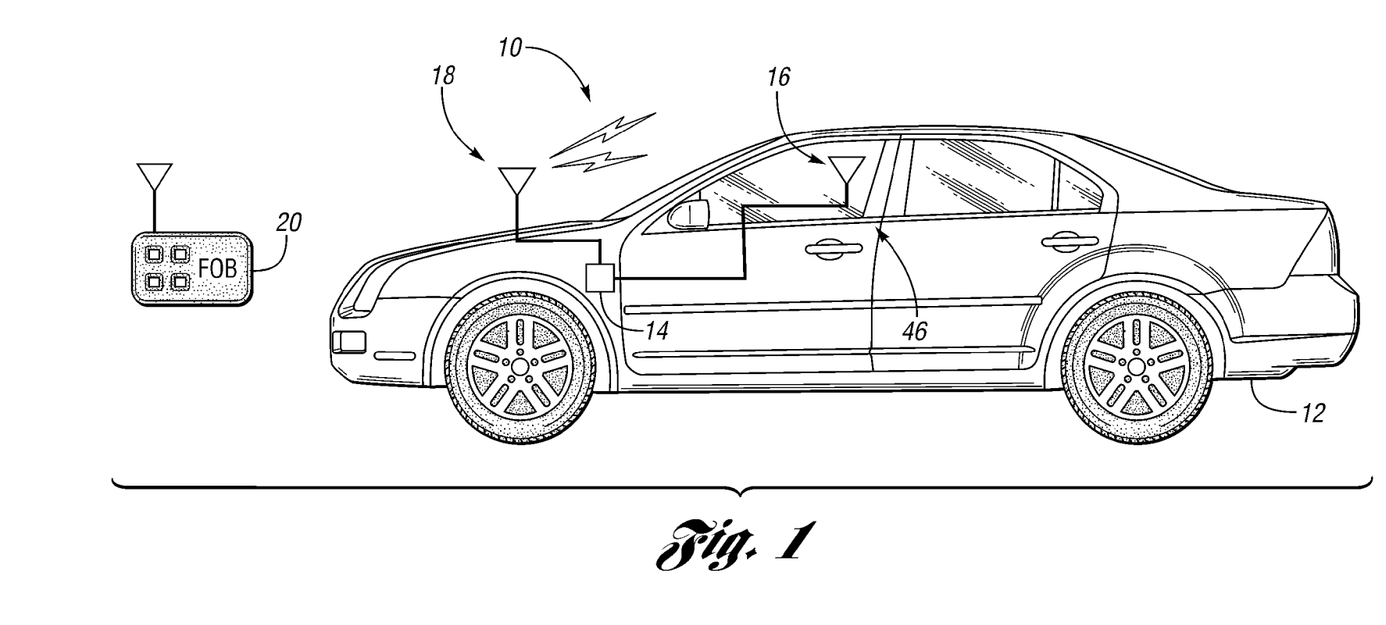
FIG. 1 illustrates a vehicle having a passive entry system in accordance with one non-limiting aspect of the present invention.

FIG. 1 illustrates a passive entry system 10 for a vehicle 12 in accordance with one non-limiting aspect of the present invention. The passive entry system 10 includes a passive entry controller 14, at least one interior antenna 16 having an interior antenna field, at least one exterior antenna 18 having an exterior antenna field, and a fob or other portable transmitter 20 having capabilities to wirelessly communicate with the passive entry controller 14 and/or the interior and exterior antennas 16, 18 to facilitate one or more passive entry related controls of one more vehicle systems.

The passive entry controller 14 is operable in cooperation with the fob 20 to facilitate passive entry related controls, and in some cases non-passive entry related control, of one or more vehicle system, such as but not limited to control of vehicle systems associated with starting, illuminating, locking, and unlocking the vehicle, i.e., the vehicle doors, lights, trunk, etc. The fob 20 may also include capabilities to facilitate remote keyless entry (RKE) and non-passive related controls. The passive entry controller 14 may be able to facilitate these types of controls based on whether signals transmitted from the interior and exterior antennas 16, 18 indicate the fob 20 to be interior or exterior to the vehicle 12.

The present invention is predominately described for exemplary purposes with respect to the passive entry controller 14 facilitating implementation of a low latency, interior/exterior (inside/outside) determination process. The process contemplated by at least one non-limiting aspect of the present invention includes passively unlocking the vehicle 12 without having to conduct an interior search for the fob 20 in the event certain prior events have occurred in such a manner that the interior/exterior positioning of the fob 20 can be determined with an acceptable degree of precision. This allows the present invention to execute passive unlock and/or other passive related vehicle system controls with less latency than that which would be required if an interior search had to be performed.

The present invention is also predominately described for exemplary purposes with respect to making the interior/exterior determination as a function of whether the fob 20 is inside or outside of the vehicle 12. The use of the vehicle 12 as the boundary or demarcation for the purposes of the interior and exterior determination is set forth without intending to limit the scope and contemplation of the present invention. This is done for exemplary purposes as the vehicle 12 structure may correspond with a wireless boundary where the antenna fields of the antennas 16, 18 overlap or generally interfere with each other. The present invention fully contemplates its application or adaptation to any number of environments where a low latency method of determining positioning of a portable or wireless transmitter 20 may be desirable.

Figure 2:
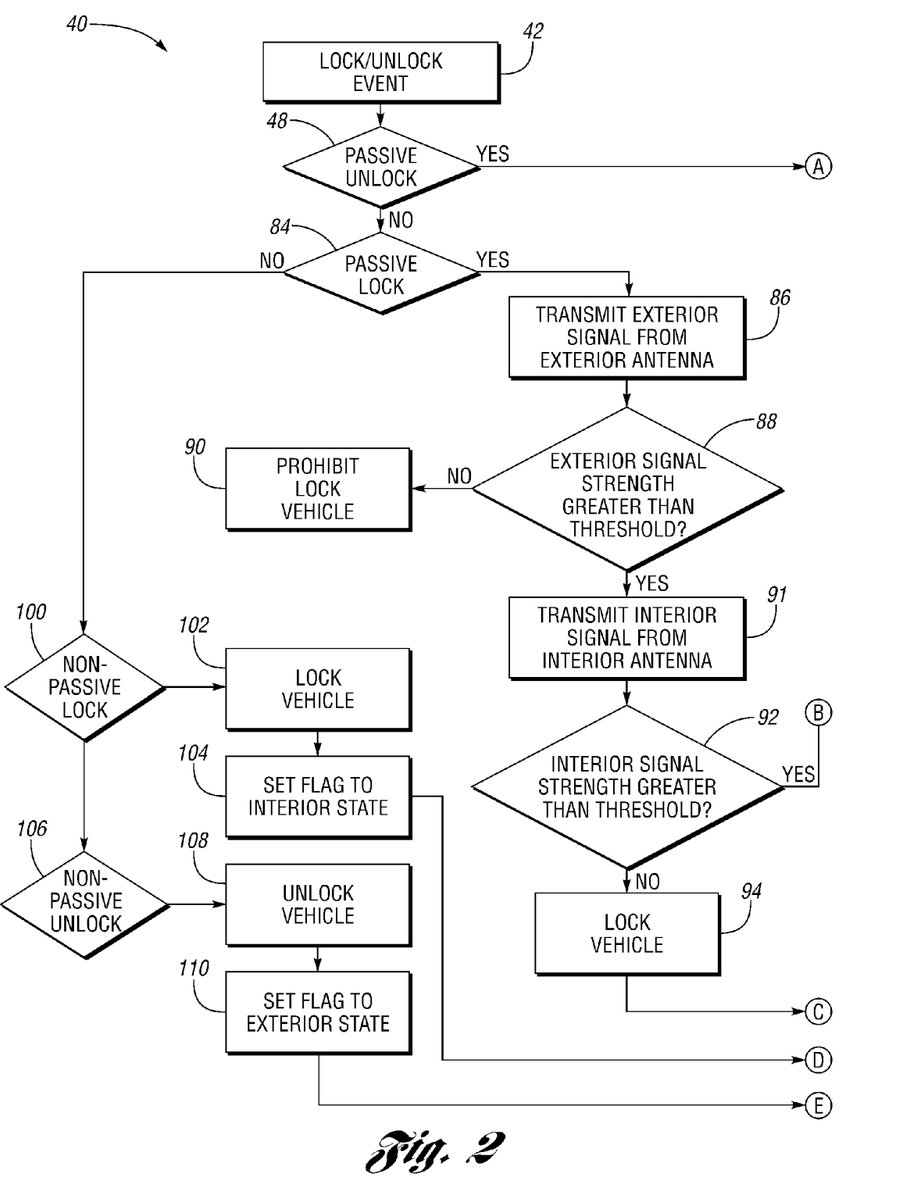
FIG. 2 illustrates a flowchart of a method for determining interior and exterior presence in accordance with one non-limiting aspect of the present invention.

FIG. 2 illustrates a flowchart 40 of a method for determining the fob 20 to be interior or exterior to the vehicle 12 in accordance with one non-limiting aspect of the present invention. The passive entry controller 14 and/or another controller included within the vehicle 12 may cooperate with the passive entry controller 14 to facilitate executing the operations necessary to implementing the processes contemplated by the present invention. The use of the interior and exterior method of the present invention is described for exemplary purposes with respect to facilitate passive vehicle lock and unlock, however, other passive and non-passive related controls may benefit from a similar low latency process for determining whether a portable device is interior or exterior to a particular boundary.

Block 42 relates to determining a lock/unlock event. The lock/unlock event may correspond with any event where the desired end result is to unlock or lock the vehicle 12, including unlocking/locking one or more vehicle doors or trunk, disarming or arming a vehicle security system (including illuminating and de-illuminating vehicle lighting), etc. The locking and unlocking may be determined from actuation of one or more buttons included on the fob 20, one or more buttons included on the interior and exterior of the vehicle 12, movement of a door handle 46 (e.g. user lifts handle to enter vehicle 12), and placement of the vehicle 12 in park/drive (e.g. vehicle locks when the gear position is placed in drive and unlocks when placed in park after being in drive).

Block 48 relates to determining whether the lock/unlock event is a passive unlock event. A passive unlock event is characterized as an attempt to unlock the vehicle 12 in a passive dependent manner where wireless communications are required between the passive entry controller 14 and the fob 20. This may occur, for example, when a user lifts the door handle 46 or presses an unlock button on the exterior of the vehicle 12. The passive unlock may be limited to events contemplated to take place from an exterior position of the vehicle 12, as opposed to events where the user would likely be inside the vehicle, e.g., actuating an interior door handle when exiting the vehicle 12.

Block 50 relates to transmitting an exterior signal from the exterior antenna 18 having the exterior field. Block 52 relates to determining whether the exterior signal received by the fob is equal to or greater than an exterior threshold. The exterior threshold may be set relatively low such that the threshold is surpassed as long as some exterior signal strength is measured by the receiving fob 20. The exterior signal strength may be measured by the fob 20 and communicated to the passive entry controller 14 in a responsive message sent from the fob 20. In the event the fob 20 fails to receive the exterior signal or the exterior signal strength is too low, Block 54 is reached and the passive unlock is prohibited. This may occur, for example, if the fob 20 being tested has moved away from the vehicle 12.

Block 58 is reached if the exterior signal strength is above the threshold and an assessment of an interior flag is made. The interior flag is set to either an interior state or an exterior state depending on a previous determination made with respect to the last known location of the fob 20 to be interior or exterior to the vehicle 12. The passive entry controller 14 may include a memory or registry to keep track of the flag state. The flag states of multiple fobs may be kept independently to identifying the last known locations of each fob separately. In the event the state flag is in the exterior state, the vehicle 12 is unlocked in Block 60. This unlock is considered for the purposes of the present invention to be completed with low latency since it is executed without having to perform an interior search for the fob 20, i.e., communication between the fob 20 and interior antenna 16 were not required.

Block 62 is reached in the event the state flag is in the interior state. The interior state would indicate the last known possession of the fob 20 to be interior to the vehicle 12. Because the last know location of the fob 20 was interior to the vehicle 12, an interior search will be performed to confirm the presence of the fob 20 before a decision on unlocking the vehicle 12 is made. This search is begun in Block 62 with the transmission of an interior signal to the fob 20 from the interior antenna 16 and completed in Block 64 with an assessment of an interior signal strength of the interior signal received by the fob 20. The interior signal strength may be measured by the fob 20 and communicated to the passive entry controller 14 in a responsive message sent form the fob 20.

In the event the fob 20 fails to receive the interior signal or the interior signal strength is too low, Block 66 is reached and the passive unlock is prohibited. This may happen in the event the fob 20 is positioned too close to the interior/exterior boundary of the vehicle such that the fob 20 is receiving signals from both of the interior and exterior antennas 16, 18. The interior antenna 16 may be configured to triangulate the fob 20 location, such as by sequentially actuating multiple antennas, or otherwise be configured to execute a more precise positioning of the fob 20 such that a sufficient register of signals from the interior antenna 16 may be presumed to indicate presence of the fob 20 within the interior of the vehicle 12, in which case it would be undesirable to unlock the vehicle 12, e.g., if a person is in the vehicle 12 with the fob 20 close to the boundary and someone exterior to the vehicle 12 lifts the door handle 46 to attempt unauthorized entry into the locked vehicle 12.

In the event Block 64 determines the interior signal strength happened to be less than the interior threshold or the fob 20 failed to receive the interior signal, the vehicle is unlocked in Block 70. The failure of the interior signal to be received or sufficiently registered by the fob 20 may be used as confirmation that the fob 20 is exterior to the vehicle 12. Due to the conflict between Block 52 indicating the fob to be exterior and Block 58 indicating the last know location of the fob 20 to be interior, the interior search of Blocks 62, 64 is needed in order to insure the fob 20 is not actually interior to the vehicle 12 as it would be undesirable to unlock the vehicle while the fob 20 was actually interior. This extra search, however, comes at the expense of increasing latency relative to the quicker unlock performed in Block 60.

In various cases, it may be beneficial after locking, unlocking or other passive entry related events, to confirm the presence of the fob 20 within the vehicle. This can be done with an interior search conducted in Blocks 72, 74. The interior search may include transmitting the interior signal in Block 72, assessing whether the fob 20 sufficiently received the interior signal to be interior, and then setting the interior flag to the interior or exterior state in Blocks 76, 78 as a function thereof. The flag may be set to exterior in Block 76 in the event the fob 20 is moved away from the vehicle 12 and to interior in Block 78 in the event the presence of the fob 20 is confirmed to be interior.

Returning to Block 48, in the event the lock/unlock event was not a passive unlock, an assessment is made in Block 84 as to whether the event is a passive lock. The passive lock may be considered to be event instigated from an exterior of the vehicle 12, such as with user actuation of a button included on the vehicle or other operation, where passive communications are required between the fob 20 and passive entry controller 14 to lock the vehicle 12. The exterior positioning of the fob 20 may be required to execute the passive lock and determined with transmission of the exterior signal in Block 86 and related threshold assessment in Block 88. In the event the test fails, the passive unlock is prohibited in Block 90.

In the event the fob 20 appears to be exterior to the vehicle in Block 88, the interior signal is transmitted in Block 91 and assessed in Block 92 in order to confirm the exterior presence prior to locking the vehicle in Block 94 or prohibiting locking in Block 96. This confirmation process, although causing a delay by the interior search of Blocks 90, 92, may be helpful in assuring that the vehicle 12 is not inadvertently locked while the fob 20 is still within the vehicle 12. An interior search is conducted within a short period of time after passively locking the vehicle 12 in Block 94 in order to confirm an interior or exterior presence of the fob 20, as a result setting the interior state flag accordingly.

Returning to Block 84, in the event the lock/unlock event was not a passive lock, an assessment is made in Block 100 as to whether the event is a non-passive lock. The non-passive lock may be considered to be a locking event which does not rely on passive communications with the fob 20 or otherwise assessing the positioning of the fob 20. Examples of non-passive locking events may include but are not limited to depression of a lock button on the fob 20 or within the interior of the vehicle 12, placement of the vehicle gear position into drive, or automatically locking through a timed or velocity sensitive auto-locking feature. If such an event occurs, the vehicle 12 is locked in Block 102 and the interior flag is set to the interior state in Block 104. The interior flag remains set to the interior state until it can be determined otherwise in order to prevent immediate unauthorized passive unlocking of the vehicle 12, e.g., if a person is in the vehicle 12 with the fob 20 close to the boundary and someone exterior to the vehicle lifts the door handle 46 to attempt unauthorized entry into the locked vehicle 12. An interior search is conducted within a short period of time after setting the flag to the interior state in Block 104 in order to confirm an interior presence of the fob 20.

Block 106 is reached if the lock/unlock event is a non-passive unlock. The non-passive unlock may be considered to be an unlocking event which does not rely on passive communications with the fob 20 or otherwise assessing the positioning of the fob 20. Examples of non-passive unlocking events may include but are not limited to depression of a unlock button on the fob 20 or within the interior of the vehicle 12, placement of the vehicle 12 into park from drive, or automatically unlocking through a timed auto-unlocking feature. If such an event occurs, the vehicle 12 is unlocked in Block 108 and the interior flag is set to the exterior state in Block 110. Optionally, an interior search may be conducted a short period of time after setting the flag to the exterior state in Block in order to confirm an exterior presence of the fob 20.

One non-limiting aspect of the present invention relates to a method for accurately determining the inside or outside location of remote transceiver fobs to facilitate correct operation while maintaining low actuation latency and providing a high level of security possible. Furthermore, several inherent passive entry obstacles, as they are related to inside/outside determination, are solved. Optionally, the user will never be able to passively lock their last fob inside the vehicle. Optionally, the passive unlock latency will always be low and the user will be able to unlock the vehicle under normal conditions without external restriction to fob location. Optionally, the user will remain secure when locking one's self inside the vehicle.

The foregoing description sets forth one non-limiting aspect of the present invention with a narrative based on a fob or other keyless, portably-type device. The present invention however fully contemplates implementing a similar process regardless of the number of fobs. A plurality of fobs may be used in cooperation with the passive entry controller to facilitate any number of passive entry related controls such that an authenticated one of the fobs may undergo the process shown in FIG. 2. In the case of authenticating, the plurality of fobs may be individually tested to determine the authenticity of one of the fobs. This may be included as a part of one of the interior and exterior signaling steps and/or in a different signaling operation. Optionally, at least in the case of an exterior, passive-entry unlocking event, the authentication process may be quickened by attempting to authenticate fobs having their interior flag set to the exterior state prior to those having their interior flag set to the interior state.

As supported above, one non-limiting aspect of the present invention contemplates a method to reduce activation latency without compromising security in any way. One non-limiting aspect of the present invention may include the following functional elements:

a passive fob which is a radio transceiver carried on the person of a user to permit authorized access for passive entry lock and unlock functions;

an external lock and unlock door handle switches at access region used to initiate passive lock and unlock function an interior region of the vehicle comprised using one or more internal antennas (The interior antennas may be mounted symmetrically within the interior region of the vehicle. The antenna fields may extends outwardly from the central mounting locations to provide, at minimum, complete coverage for the entire established interior region. If excessive interior antenna field leakage extends beyond the perimeter of the interior region and into the exterior region, it can be nullified by using other established techniques to determine when the fob has extended beyond the interior region limits. One such technique is to measure the field strength of the signal from one or more of the interior antennas used during the communication events. The signal strength decreases as it is related to distance. By employing such techniques, a very accurate perimeter for the interior region can be created);

an exterior access region of the vehicle comprised using one or more external antennas. (The external antennas may be mounted externally around the parameter of an interior region of the vehicle. Because of this physical arrangement, uncontrollable field leakage from the exterior antennas may extend into the interior region of the vehicle, thus making it difficult or impossible to determine true inside or outside location of a fob by using the exterior antennas alone. Furthermore, it may be very difficult or impossible to create an accurate boundary for a region where the antenna is located directly at the perimeter. This is due to excessively strong signal amplitudes resulting in saturation of the location measuring circuit. This limitation shall be resolved by employing the method as described in this invention disclosure.); and a conditional history status flags internal to the passive entry system maintained to indicate the last known 'inside' state of all associated fobs.

One non-limiting aspect of the present invention contemplates a passive entry control system continuously monitoring for the following opportunities and events to update the interior flag as follows:

An 'inside' flag for a fob may be SET when:
1. The fob is found to be positively inside the vehicle after a search was performed within the established interior region. The interior region can be searched for various passive entry related functions during normal operation. The method disclosed herein shall take advantage of this search opportunity and update the 'inside' flags anytime fobs are found to be within the interior region.
2. The vehicle is locked remotely by RKE (Remote Keyless Entry), the user locks all doors through some mechanical means, the user locks all doors through some electrical interior door switch, or the vehicle automatically locks all doors via a timed auto-locking feature. This forced setting of all the 'inside' flags precedes the event of an interior search. After the locking event is detected and a short time has elapsed, a dedicated interior search may be executed to determine the true location of any present fobs. If any present fob is found to be positively inside the established interior region of the vehicle, then its 'inside' flag shall remain set.

The 'inside' flag for a fob may be RESET when:
1. The fob is not found inside the vehicle anytime after a search is performed within the established interior region during a dedicated search or other passive entry related search function.
2. The vehicle is unlocked remotely by RKE (Remote Keyless Entry) and all doors become unlocked, the user unlocks all doors through some mechanical means or the user unlocks all doors through some electrical interior door switch.

One non-limiting aspect of the present invention relates to a passive entry dependent exterior locking event. When passively locking the vehicle by pressing the external lock button, the passive entry system must decide if the requested lock function is valid and authorized for the associated access region. According to the present invention, the passive entry system may first attempt to authorize a valid fob by communicating through the antennas that comprise the exterior region of the vehicle. Because the established exterior region can also have field leakage into the interior region, it may not be determined at this point if all present fobs are located inside or outside of the vehicle. If present fobs are detected somewhere within the exterior region, the passive entry system may then rule out if any of the same present fobs are also located within the interior region by executing a dedicated search using the antennas that comprise the interior region of the vehicle.

If any of the same fobs are located in both exterior and interior regions, then it may be determined that those fobs are located inside the vehicle and are not authorized to execute the requested lock function. If one or more present fobs are located only within the exterior region and are not located anywhere within the interior region of the vehicle, then the fob may be authorized and the passive entry system can execute the requested lock function. It is permitted for other fobs to be locked inside the vehicle, as long as at least one valid authorized fob is located only within the exterior region. After the locking function has executed and a short time has elapsed, the passive entry system may automatically execute a dedicated interior search to update the 'inside' flag of any fob that may be locked inside the vehicle. The purpose of this additional search is to update the 'inside' flags for the associated fobs. The 'inside' flags are used conditionally as explained further in the unlocking section. The actuation latency for locking is slower due to the additional time required to always search the interior region of the vehicle. This additional latency is not of significant importance for locking.

One non-limiting aspect of the present invention relates to a low latency, passive entry dependent exterior unlocking event. When passively unlocking the vehicle by pulling an external unlock switch, the passive entry system may decide if the requested unlock function is valid and authorized for the associated access region. The passive entry system may first attempt to authorize a valid fob by communicating through the antennas that comprise the exterior region of the vehicle. Because the established exterior region can also have field leakage into the interior region, it may not be determined at this point if all present fobs are also located inside or outside of the vehicle. Therefore, to keep actuation latency low, the immediate decision to unlock may based on the history derived from the 'inside' status flag for any fob currently being authorized.

If the 'inside' flag is not set, then it may be assumed that the fob being authorized is last known to not be located within the interior region of the vehicle and therefore the associated access region can immediately be unlocked without further delay. This condition has the added benefit that the unlocking function may execute without additional restrictions based on fob location. For example, if the fob is located near a boundary where leakage from the interior region is prominent, then it could appear that the fob is actually located within the interior region, when in fact it is not. In this case of low latency unlocking as contemplated by the present invention; based on the 'inside' flag not being set, the interior regions is never activated, thus possible leakage contributing to further restrictions or delays are eliminated, further supporting high reliability for unrestricted unlocking.

All present fobs that do not have their 'inside' flag set may always have priority and may attempt to be authorized first. If one fob fails authorization for any reason, the next present fob that does not have its 'inside' flag set may be authorized next. If all present fobs that do not have their 'inside' flag set have been exhausted and still no valid fob can be authorized, then any fobs that are present with their 'inside' flags set may be processed further. If the 'inside' flag is set for a fob, then an additional search of the interior region is required to positively confirm the true location, thus causing additional actuation latency. The passive entry system may determine if any fobs that are found to be located within the exterior region and have their 'inside' flags set are also present within the interior region by executing a dedicated search using the antennas that comprise the interior region of the vehicle. If the same fobs are located in both exterior and interior regions, then it may be determined that those fobs must be located inside the vehicle and thus the vehicle cannot be unlocked via the exterior unlock switch. If any present fobs with their 'inside' flag set are located only within the exterior region and are not located anywhere within the interior region of the vehicle, then the passive entry system can execute the requested unlock function.

The actuation latency for this type of unlocking is slower due to the additional time required to search the interior region of the vehicle. This additional latency has consequences and will most likely contribute to a momentary unfavorable user experience. This aforementioned scenario where the fob was last known to be 'inside' the vehicle when in actuality it was not, is an extremely rare circumstance that would involve a user to be sitting within the interior region of the vehicle when the vehicle was locked. After some time has elapsed, the user inside the vehicle would need to pass the fob through the window to a second user who would be outside the vehicle. The outside user would then attempt to unlock the vehicle. Since the fob was last known to be 'inside' the vehicle, then the additional interior region search would be required thus causing additional actuation latency. This additional latency comes at the expense of insuring the user can unlock the vehicle, which for a passive entry system is of the utmost importance.

One non-limiting aspect of the present invention relates to a passive entry dependent, secure interior locking event. When a user locks the vehicle internally by pressing an RKE lock button or by manually pressing any internal vehicle locking switches, etc., the passive entry system may immediately take the securest position and assumes that all fobs are currently located on the person or inside the vehicle and thus immediately sets the 'inside' flag for all associated fobs. This may be done to maintain the highest level of security for the user at that moment. The 'inside' flag for a fob may be used to determine if the additional interior region search is required to positively confirm the inside or outside location of any present fob before authorizing the requested unlock function.

If, a user under duress unlocks and enters the vehicle in a hasty manner, to insure personal security, the user may then quickly lock the vehicle in any one of the previously mention manual methods. Upon detecting a fully locked vehicle, the passive entry system may now immediately force set the 'inside' flags for all associated fobs. Next, if an unauthorized assailant attempts to gain entry into the vehicle by pulling the external lock switch, the passive entry system may then attempt to locate a valid authorized fob within the exterior zone. Since it is known that the exterior region antennas have field leakage into the interior region of the vehicle, it is likely that some fobs physically located inside the vehicle could inadvertently be detected during the exterior region communication. To prevent immediate actuation of the unlock function based solely on locating any valid fob in the exterior region alone, the 'inside' flag for the fob is tested. Since the 'inside' flag was forced as set during the manual locking event, the passive entry system will then execute the additional interior region search and immediately determine that the responding fobs are all truly located on the interior of the vehicle and thus deny actuation of the unlock function, therefore insuring security for the user inside the vehicle.

One non-limiting aspect of the present invention contemplates, during normal use conditions, the logic as described in this invention to be completely transparent to the user. One or more of the following passive entry obstacles, as they are related to accurate inside/outside detection, are solved: (1) the user will never be able to passively lock their last fob inside the vehicle; (2) the passive unlock latency will always be transparently low under all normal conditions; (3) the user will always be able to unlock the vehicle under normal conditions if the fob is located on the edge of the interior region (on the vehicle door or glass surface); and (4) the user will remain secure when locking one's self inside the vehicle.

One non-limiting aspect of the present invention relates to a method for accurately determining the inside or outside location of a fob and allowing correct operation of a passive entry system, while maintaining low actuation latency and providing the highest level of security possible.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating passive entry dependent, exterior unlock of a vehicle as a function of signals communicated to a vehicle-based passive entry controller from a passive entry fob, the vehicle including at least an exterior antenna having an exterior antenna field and at least an interior antenna having an interior antenna field, the method comprising:
   transmitting a exterior signal to the fob from the exterior antenna;
   determining a state of an interior flag of the fob to be in one of an exterior state and an interior state; and
   allowing the passive entry controller to unlock the vehicle without transmitting an interior signal to the fob from the interior antenna in the event an exterior signal strength of the exterior signal received by the fob is greater than an exterior threshold and the interior flag is in the exterior state.

2. The method of claim 1 further comprising, prior to allowing the passive entry controller to unlock the vehicle, confirming the fob to be exterior of the vehicle in the event the interior flag is in the interior state.

3. The method of claim 2 further comprising transmitting the interior signal to the fob from the interior antenna and confirming the fob to be exterior to the vehicle in the event the interior signal is not received by the fob or an interior signal strength of the interior signal received by the fob is less than an interior threshold.

4. The method of claim 3 further comprising preventing the passive entry controller from unlocking the vehicle in the event the interior signal strength is equal to or greater than the interior threshold.

5. The method of claim 1 further comprising authorizing the fob prior to allowing the passive entry controller to unlock the vehicle, the fob being authorized from one of a plurality of fobs.

6. The method of claim 5 further comprising authorizing the fob according to an authorization procedure that attempts to authenticate the ones, if any, of the plurality of fobs having interior flags in the exterior state prior to the ones, if any, of the plurality of fobs having interior state flags in the interior state.

7. The method of claim 1 further comprising setting the interior state flag to the exterior state after failing to detect a presence of the fob with signals transmitted from the interior antenna.

8. The method of claim 1 further comprising setting the interior flag to the interior state after detecting a presence of the fob with signals transmitted from the interior antenna.

9. The method of claim 1 further comprising setting the interior flag to the interior state upon non-passive locking of the vehicle.

10. The method of claim 1 further comprising setting the interior flag to the exterior state upon non-passive unlocking of the vehicle.

11. The method of claim 1 further comprising, upon detecting a passive entry dependent, locking event, transmitting the interior signal to the fob from the interior antenna, re-transmitting the exterior signal to the fob and preventing the passive entry controller from locking the vehicle in the event the exterior signal strength of the exterior signal received by the fob is greater than the exterior threshold and the interior signal is received by the fob or an interior signal strength of the interior signal received by the fob is equal to or greater than an interior threshold.

12. The method of claim 11 further comprising allowing the passive entry controller to lock the vehicle in the event the exterior signal strength of the exterior signal received by the fob is greater than the exterior threshold and the interior signal is not received by the fob or the interior signal strength of the interior signal received by the fob is less than the interior threshold.

13. A passive entry controller being operable to:
   issue instructions to facilitate control of one or more vehicle systems according to passive entry wireless signals received from a fob;
   passively unlock the vehicle in the event each of the following conditions:
   (i) an exterior search detects the presence of the fob and an interior status flag of the fob is set to an exterior state; and (ii) the exterior search detects the presence of the fob, an interior search fails to detect the presence of the fob, and the interior status flag of the fob is set to the exterior state.

14. The passive entry controller of claim 13 further being operable, in response to detecting a passive entry dependent unlocking event, to authenticate the fob from a plurality of fobs according an authentication process where an order used to attempt authentication of each the plurality of fobs begins to attempt authentication of any of the plurality of fobs with the interior flag set to the exterior state prior to any of the plurality of fobs with the interior flag set to the interior state.

15. The passive entry controller of claim 13 further being operable to passively unlock the vehicle in the event the exterior search detects the presence of the fob and the interior search fails to detect the presence of the fob.

16. A method of determining a portable transmitter to be interior or exterior of a wireless boundary defined by at least a first antenna having a first antenna field and at least a second antenna having a second antenna field, the method comprising:
    transmitting a first signal to the portable transmitter from the first antenna;
    determining a state of an state flag of the portable transmitter to be in one of an exterior state and an interior state;
    measuring a first signal strength for the first signal received by the portable transmitter; and
    determining the portable transmitter to be exterior of the boundary in the event the first signal strength is greater than an exterior threshold and the state flag is in the exterior state.

17. The method of claim 16 further comprising, in the event the state flag is in the interior state:
    transmitting a second signal to the portable transmitter from the second antenna;
    measuring a second signal strength for the second signal received by the portable transmitter; and
    determining the portable transmitter to be exterior of the boundary in the event the second signal strength is less than an interior threshold.

18. The method of claim 17 further comprising determining the portable transmitter to be interior of the boundary in the event the second signal strength is greater than or equal to the interior threshold.

19. The method of claim 16 further comprising, in the event multiple portable transmitters are capable of receiving the first signal, determining an authenticated one of the multiple portable transmitters to be interior or exterior of the wireless boundary based on an authentication process where each portable transmitter having the state flag in the exterior state is attempted for authentication prior to portable transmitters having the stage flag set to the interior state.

20. The method of claim 16 further comprising:
    setting the state flag to the exterior state in the event the portable transmitter fails to receive signals transmitted from the second antenna;
    setting the state flag to the interior state in the event the portable transmitter fails to receive signals transmitted from the second antenna
    setting the state flag to the interior state upon non-passive locking of the vehicle; and
    setting the state flag to the exterior state upon non-passive unlocking of the vehicle.

* * * * *

UNITED STATES PATENT AND TRADEMARK OFFICE
CERTIFICATE OF CORRECTION

| | | |
|---|---|---|
| PATENT NO. | : 8,427,289 B2 | Page 1 of 1 |
| APPLICATION NO. | : 12/816675 | |
| DATED | : April 23, 2013 | |
| INVENTOR(S) | : Riad Ghabra et al. | |

It is certified that error appears in the above-identified patent and that said Letters Patent is hereby corrected as shown below:

In the Claims

Column 9, Line 61, Claim 1:

After "transmitting" delete "a" and insert -- an --.

Column 11, Line 8, Claim 14:

After "fobs according" insert -- to --.

Column 11, Line 24, Claim 16:

After "a state of" delete "an" and insert -- a --.

Signed and Sealed this
Twenty-seventh Day of August, 2013

Teresa Stanek Rea
*Acting Director of the United States Patent and Trademark Office*